US012676061B2

(12) United States Patent
Golbon Haghighi et al.

(10) Patent No.: US 12,676,061 B2
(45) Date of Patent: Jul. 7, 2026

(54) VEHICULAR CABIN MONITORING SYSTEM

(71) Applicant: Magna Electronics Inc., Auburn Hills, MI (US)

(72) Inventors: Mohammad Hossein Golbon Haghighi, Waltham, MA (US); Ashwin Alapakkam Kannan, Quincy, MA (US); Ashesh Goswami, Somerville, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 250 days.

(21) Appl. No.: 18/406,511

(22) Filed: Jan. 8, 2024

(65) Prior Publication Data

US 2024/0233511 A1     Jul. 11, 2024

Related U.S. Application Data

(60) Provisional application No. 63/479,026, filed on Jan. 9, 2023.

(51) Int. Cl.
*G08B 21/22*          (2006.01)
*B60R 21/015*         (2006.01)
(Continued)

(52) U.S. Cl.
CPC ........ *G08B 21/22* (2013.01); *B60R 21/01534* (2014.10); *G01S 13/89* (2013.01);
(Continued)

(58) Field of Classification Search
CPC .... A61B 5/0022; B60H 1/00742; B60J 10/00; B60K 28/066; B60N 2/0276;
(Continued)

(56) References Cited

U.S. PATENT DOCUMENTS

| | | | |
|---|---|---|---|
| 6,674,895 B2 | 1/2004 | Rafii et al. | |
| 6,678,039 B2 | 1/2004 | Charbon | |

(Continued)

FOREIGN PATENT DOCUMENTS

| | | | | | |
|---|---|---|---|---|---|
| CN | 109774641 A | * | 5/2019 | ........... | B60R 21/015 |
| JP | 2020121713 A | * | 8/2020 | ............. | G06N 3/084 |

OTHER PUBLICATIONS

Sriranga et al: Novel radar based in-vehicle occupant detection using convolutional neural networks (Year: 2022).*

*Primary Examiner* — Stephen R Burgdorf
(74) *Attorney, Agent, or Firm* — HONIGMAN LLP

(57)          ABSTRACT

A vehicular cabin monitoring system includes a radar sensor disposed at a vehicle so as to sense interior of the vehicle. The radar sensor includes at least one transmitter that transmits radio signals, and a plurality of receivers that receive radio signals. The vehicular cabin monitoring system, responsive to processing by a processor of radar data captured by the radar sensor and using a neural network, determines occupancy of a seat of the vehicle. The determined occupancy of the seat of the vehicle includes (i) the seat of the vehicle is not occupied, (ii) the seat of the vehicle is occupied by an adult and (iii) the seat of the vehicle is occupied by a child. The vehicular cabin monitoring system generates an alert responsive to determining that the seat of the vehicle is occupied by a child and that no seat of the vehicle is occupied by an adult.

19 Claims, 13 Drawing Sheets

(51) Int. Cl.

| | |
|---|---|
| *G01S 13/89* | (2006.01) |
| *G06V 20/59* | (2022.01) |
| *G08B 21/24* | (2006.01) |
| *G08B 25/00* | (2006.01) |

(52) U.S. Cl.
CPC .......... *G06V 20/593* (2022.01); *G08B 21/24* (2013.01); *G08B 25/00* (2013.01)

(58) Field of Classification Search
CPC ........ B60N 2/2806; B60Q 9/005; B60R 1/29; B60R 16/037; B60R 21/01516; B60R 21/01534; B60R 21/01552; B60R 21/01554; B60R 25/1004; B60W 40/08; B60W 40/09; B60W 50/14; G01S 7/027; G01S 7/417; G01S 13/34; G01S 13/42; G01S 13/584; G01S 13/89; G01S 13/931; G01S 15/523; G06F 16/951; G06V 20/593; G06V 40/103; G08B 13/19613; G08B 21/22; G08B 21/24; G08B 25/00; G08B 29/186
USPC ...................................................... 340/573.1
See application file for complete search history.

(56) References Cited

U.S. PATENT DOCUMENTS

| | | | |
|---|---|---|---|
| 6,690,354 | B2 | 2/2004 | Sze |
| 6,710,770 | B2 | 3/2004 | Tomasi et al. |
| 6,906,793 | B2 | 6/2005 | Bamji et al. |
| 6,919,549 | B2 | 7/2005 | Bamji et al. |
| 7,203,356 | B2 | 4/2007 | Gokturk et al. |
| 7,212,663 | B2 | 5/2007 | Tomasi |
| 7,340,077 | B2 | 3/2008 | Gokturk et al. |
| 7,352,454 | B2 | 4/2008 | Bamji et al. |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 8,013,780 | B2 | 9/2011 | Lynam |
| 8,027,029 | B2 | 9/2011 | Lu et al. |
| 9,036,026 | B2 | 5/2015 | Dellantoni et al. |
| 9,146,898 | B2 | 9/2015 | Ihlenburg et al. |
| 9,575,160 | B1 | 2/2017 | Davis et al. |
| 9,599,702 | B1 | 3/2017 | Bordes et al. |
| 9,689,967 | B1 | 6/2017 | Stark et al. |
| 9,753,121 | B1 | 9/2017 | Davis et al. |
| 9,869,762 | B1 | 1/2018 | Alland et al. |
| 9,954,955 | B2 | 4/2018 | Davis et al. |
| 10,551,494 | B2 * | 2/2020 | Hirai ....................... G01S 7/412 |
| 10,866,306 | B2 | 12/2020 | Maher et al. |
| 11,112,498 | B2 | 9/2021 | Miu |
| 11,131,117 | B2 | 9/2021 | Shah et al. |
| 11,951,993 | B2 | 4/2024 | Lu |
| 12,032,089 | B2 * | 7/2024 | Meissner ............... G06N 5/046 |
| 12,235,389 | B2 | 2/2025 | Miu et al. |
| 2011/0267221 | A1 * | 11/2011 | Brundick ................ G01S 13/02 |
| | | | 342/180 |
| 2017/0276788 | A1 | 9/2017 | Wodrich |
| 2017/0315231 | A1 | 11/2017 | Wodrich |
| 2017/0356994 | A1 | 12/2017 | Wodrich et al. |
| 2018/0065504 | A1 * | 3/2018 | Lan ....................... B60W 10/30 |
| 2019/0339382 | A1 | 11/2019 | Hess et al. |
| 2020/0143182 | A1 * | 5/2020 | Noh ...................... G06V 10/764 |
| 2021/0206343 | A1 * | 7/2021 | Welk ....................... B60R 22/48 |
| 2021/0209927 | A1 * | 7/2021 | Hedges ................ G08B 25/005 |
| 2022/0388464 | A1 * | 12/2022 | Roberts ................. B60R 22/322 |
| 2023/0333232 | A1 * | 10/2023 | Tapia .................... G01S 7/0236 |
| 2024/0094332 | A1 | 3/2024 | Boddi et al. |
| 2024/0125921 | A1 * | 4/2024 | Wang .................... G06V 10/143 |
| 2024/0172950 | A1 * | 5/2024 | Cong ..................... G01S 13/88 |

* cited by examiner

Radar mounted at the center of the roof inside the vehicle, behind 1st row

| Scenarios | Zone 1 | Zone 2 | Image Count |
|---|---|---|---|
| 1 | Empty | Empty | 6324 |
| 2 | Adult | Empty | 2334 |
| 3 | Empty | Adult | 3786 |
| 4 | Adult | Adult | 3378 |
| 5 | Child | Empty | 4386 |
| 6 | Empty | Child | 3744 |
| 7 | Child | Adult | 3534 |
| Total | | | 27486 |

FIG. 6

| Class (ID) | Total Zonal Image Count | Train Zonal Image Count | Test Zonal Image Count |
|---|---|---|---|
| Empty (0) | 26898 | 18840 | 8058 |
| Child (1) | 11664 | 8168 | 3496 |
| Adult (2) | 16410 | 11492 | 4918 |

FIG. 7

| Single float32 (non-quantized model) | Precision ResNet-18 | Prediction | | |
|---|---|---|---|---|
| | | Empty | Child | Adult |
| Ground Truth | Empty | 8052 | 6 | 0 |
| | Child | 6 | 3490 | 0 |
| | Adult | 15 | 6 | 4897 |
| Accuracy | | | | 99.79% |

FIG. 8A

| INT-8 (quantized model) | ResNet-18 | Prediction | | |
|---|---|---|---|---|
| | | Empty | Child | Adult |
| Ground Truth | Empty | 8040 | 18 | 0 |
| | Child | 18 | 3478 | 0 |
| | Adult | 69 | 111 | 4738 |
| Accuracy | | | | 98.68% |

FIG. 8B

| | Single float32 (non-quantized model) | Precision ResNet-18 | INT-8 (quantized model) | ResNet-18 |
|---|---|---|---|---|
| Model Size (in MB) | 44.8 | | 11.2 | |
| Runtime (ms) | 55 | | 29.4 | |
| Accuracy (percent) | 99.79 | | 98.68 | |

FIG. 8C

VEHICULAR CABIN MONITORING SYSTEM

CROSS REFERENCE TO RELATED APPLICATION

The present application claims the filing benefits of U.S. provisional application Ser. No. 63/479,026, filed Jan. 9, 2023, which is hereby incorporated herein by reference in its entirety.

FIELD OF THE INVENTION

The present invention relates generally to a vehicular sensing system for a vehicle and, more particularly, to a vehicular sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular cabin monitoring system includes a radar sensor disposed at an interior cabin of a vehicle equipped with the vehicular cabin monitoring system. The radar sensor senses at least a portion of the interior cabin of the vehicle. The radar sensor includes (i) at least one transmitter that transmits radio signals and (ii) a plurality of receivers that receive radio signals. The system includes an electronic control unit (ECU) with electronic circuitry and associated software. The electronic circuitry of the ECU includes a processor operable to process radar data captured by the radar sensor. Radar data captured by the radar sensor is transferred to the ECU. The vehicular cabin monitoring system, via processing by the processor of radar data captured by the radar sensor and using a neural network trained using radar sensor data, determines occupancy of a seat of the vehicle. The determined occupancy of the seat of the vehicle includes one selected from the group consisting of (i) the seat of the vehicle is not occupied, (ii) the seat of the vehicle is occupied by an adult and (iii) the seat of the vehicle is occupied by a child. The vehicular cabin monitoring system generates an alert at least in part responsive to (i) determination that the seat of the vehicle is occupied by a child and (ii) determination that no seat of the vehicle is occupied by an adult. The vehicular cabin monitoring system generates the alert at least in part responsive to determination that (i) the seat of the vehicle is occupied by the child and (ii) no seat is occupied by an adult for a threshold period of time.

These and other objects, advantages, purposes and features of the present invention will become apparent upon review of the following specification in conjunction with the drawings.

BRIEF DESCRIPTION OF THE DRAWINGS

FIG. 6 is a table of exemplary test images for training a model of the system of FIG. 1;

FIG. 7 is a table of exemplary image distributions for training a model of the system of FIG. 1;

FIGS. 8A-8C are tables of exemplary training results of a model of the system of FIG. 1.

DESCRIPTION OF THE PREFERRED EMBODIMENTS

A vehicle sensing system and/or object detection system and/or alert system operates to capture sensing data interior of the vehicle and may process the captured data to detect objects within the vehicle, such as to detect occupants within the vehicle. The system includes a processor that is operable to receive sensing data from one or more sensors and provide an output, such as an alert or control of a vehicle system.

Figure 1:
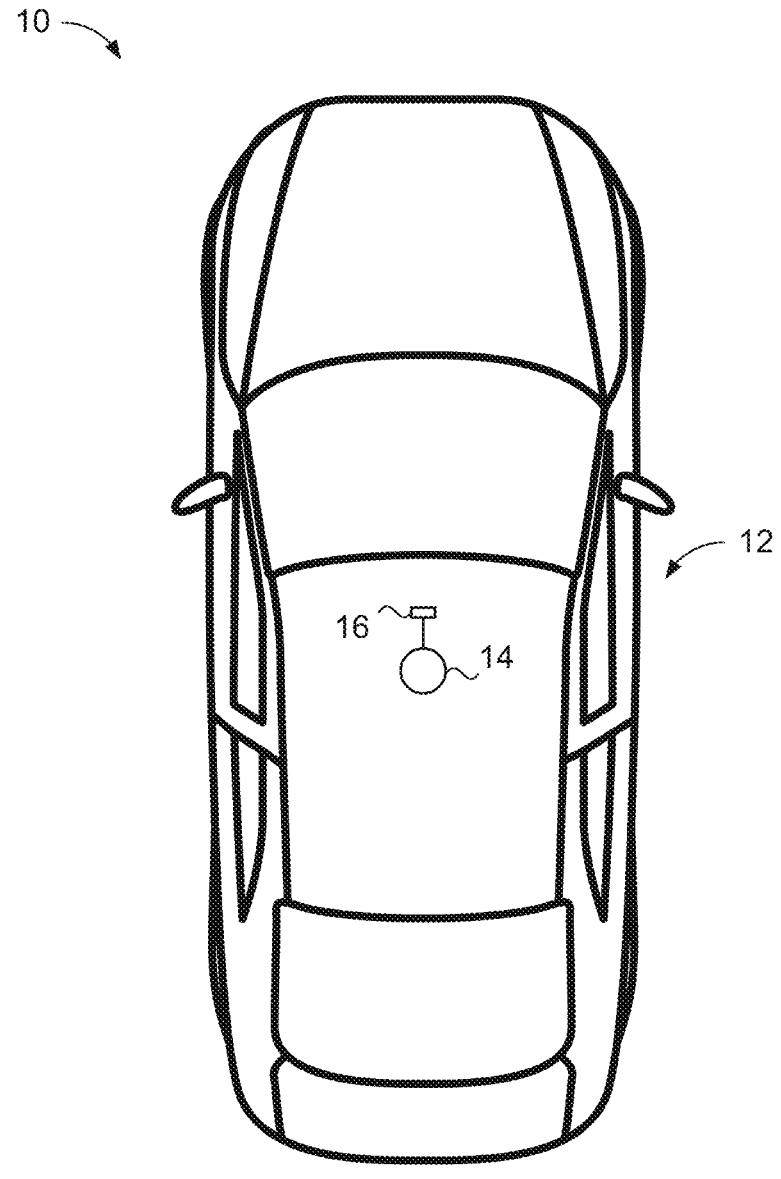
FIG. 1 is a plan view of a vehicle with a sensing system that incorporates a radar sensor.

Referring now to the drawings and the illustrative embodiments depicted therein, a vehicle 10 (FIG. 1) includes a driving assistance system or sensing system 12 that includes at least one radar sensor unit 14 which senses regions interior of the vehicle (such as one or more seating areas within a cabin of the vehicle). The sensing system 12 includes a data processor or compute system (such as a control or processor or compute system or electronic control unit (ECU) 16 that includes a data processor) that is operable to process data captured by the radar sensor(s). The sensing system includes a radar sensor that includes a plurality of transmitters that transmit radio signals via a plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of an alert system of the vehicle, with the alert system controlling at least one function or feature of the vehicle responsive to processing of the data captured by the radar sensors. The data transfer or signal communication from the sensor to the ECU may comprise any suitable data or communication link, such as a vehicle network bus or the like of the equipped vehicle.

Radar sensing systems such as mm-wave multiple-input multiple-output (MIMO) frequency-modulated continuous wave (FMCW) radar sensing systems may easily estimate a location and velocity of all targets in their field of view (FoV) of the radar sensor or sensors of the system. However, target classifications for some applications are a challenge for these radar systems. Implementations herein include using a radar sensor disposed at a vehicle to detect and classify children seated in the cabin of the equipped vehicle.

Children are especially vulnerable to heat stroke when left in a hot vehicle, even if the windows are slightly open. Heat stroke can occur when the body cannot regulate its temperature and can be deadly. A child's body temperature rises three to five times faster than adults. When a child is in a hot vehicle, their temperature can rise quickly—and they can die within minutes when their body temperature reaches 107 degrees Fahrenheit. Hundreds of children have died of heat stroke from being trapped in a hot vehicle.

Implementations herein include a low-cost and cost effective mmWave MIMO FMCW radar sensor that detects a child left alone in a vehicle and alerts the owner or emergency services or nearby adults to prevent heat stroke fatalities. While a child may be identified using a camera, cameras are an intrusive approach that may, for example, make occupants uncomfortable. Instead, the sensing system implements a non-intrusive approach to detect the presence or absence of child/children using non-intrusive FMCW radar sensors and, for example, one or more neural networks (e.g., a convolutional neural network (CNN)). The radar sensor may operate at any frequency (e.g., 60 GHz) that avoids disruption or interference with collision avoidance radar sensors or advanced driver assistance radars (ADAS) (or any other driver assistance system that implement radar sensors) that typically operate at 77 GHz.

By combining the strengths of convolutional neural networks (CNNs) and mmWave in-cabin radar sensor signals, the sensing system includes the ability to detect and recognize a child's presence in vehicles. The system may be highly accurate (e.g., approximately 99 percent accurate) in determining whether the car (or a particular seat) is empty, is occupied by a child, or is occupied by an adult.

Figures 2A, 2B:
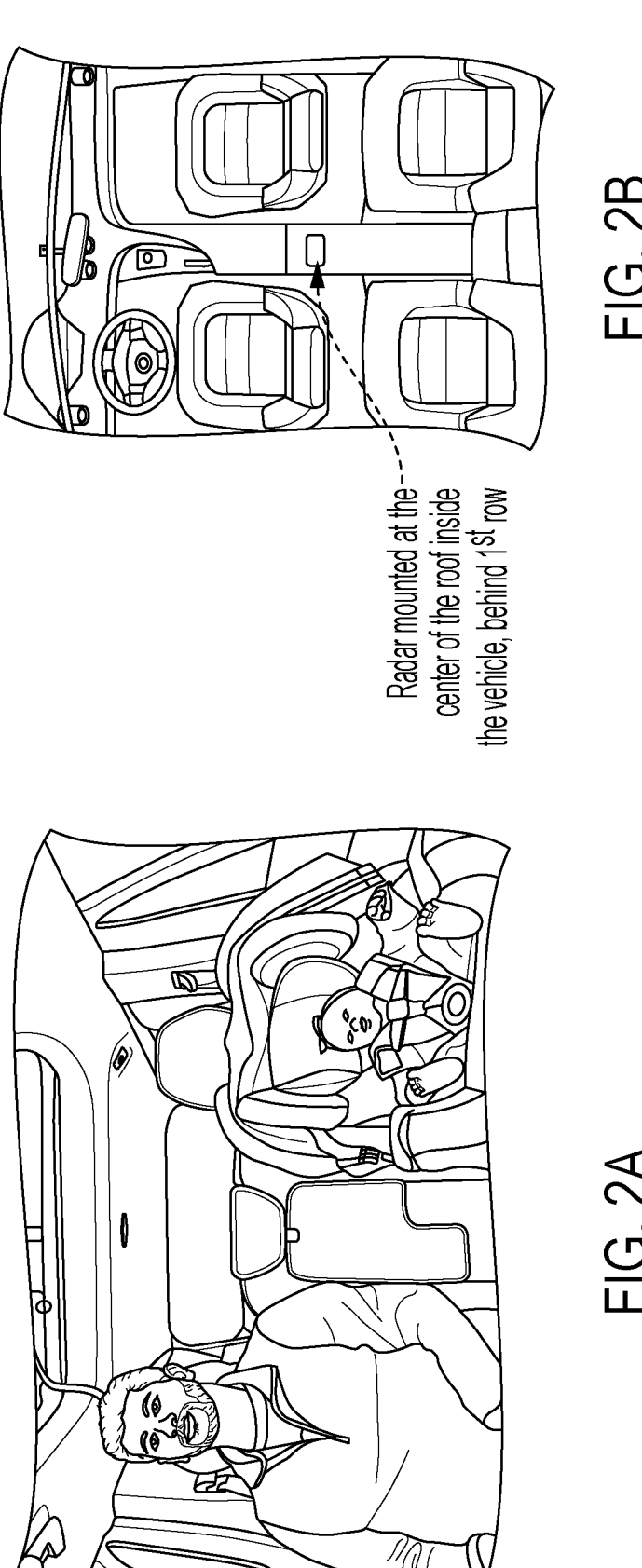
FIG. 2A is an image of an adult and a child in rear seats of a vehicle.
FIG. 2B is an image of a mounting position of the radar sensor of FIG. 1 within a cabin of a vehicle.

This problem may be framed as a classification task where, given an input, the sensing system determines whether the input belongs to one of three classes: (i) empty (i.e., the seat is unoccupied), (ii) a child present in the seat, or (iii) an adult present in the seat. The system may first collect radar data to train and evaluate a classification algorithm. As shown in FIGS. 2A and 2B, the radar sensor(s) may be disposed at a location within the cabin of the vehicle that allows the sensor to have some or all of the seats (e.g., the rear seats) of the vehicle within the field of sensing of the radar sensor. For example, the radar sensor may be disposed at a central location at or behind a front row of seats (e.g., at a roof or at a headliner of the vehicle or at a central console of the vehicle) and in front of a second row of seats. Next, the collected radar data is fed as inputs to train a classification model (e.g., a CNN or other machine learning model). Third, the model is trained to discriminate between the three classes, namely, empty (i.e., an unoccupied seat), a child (i.e., a seat occupied by a child), or an adult (i.e., a seat occupied by an adult). Optionally, the trained model may be quantized to make the model more compact and more suited for resource-constrained hardware devices typically used in automotive applications. Quantization is a technique that reduces the size of models by representing the weights and/or activations of the model using lower precision data types such as integers versus floats.

Any suitable radar sensor operating around, for example, 60 GHz may be used. For example, the radar sensor may include an mmWave multiple-input multiple-output (MIMO) frequency modulated continuous wave (FMCW) radar to collect training and testing datasets for radar classification. The radar sensor may be equipped with any number of transmit and receive antennas with any operating frequency range. For example, the radar sensor is equipped with four transmit and three receive antennas, and the operating frequency range is 60-64 GHz with a bandwidth of 4 GHz. The radar sensor may have a wide field of view to ensure that each seat of the vehicle is within the field of view. For example, the radar's field of view may be 60 degrees on either side of the boresight angle, allowing the radar sensor to detect objects within a 120 degree range. Depending on mounting location (e.g., between the first and second rows of seats), the radar sensor may be mounted with a tilt (e.g., a 15 degree tilt) toward the rear of the vehicle because a mounting angle parallel to the floor may cause undesirable reflections (and by tilting toward the rear, the field of sensing may include a third row of seats, if applicable). Optionally, a ground clutter filter (e.g., during a post-processing step) may be applied to sensor data captured by the radar sensor to remove any unwanted reflections from returns without removing reflections from vehicle occupants.

In some examples, a range fast Fourier transform (FFT) is applied to the radar received signals to estimate the distance of the objects from the radar sensor, and/or a beamforming algorithm may be used to estimate the azimuth angle of arrival of all targets in the field of view of the radar sensor.

Range estimation for radar sensors refers to the process of determining the distance of an object from the radar sensor. Range estimation is an important function of radar systems, as it allows the radar to determine the position and movements of objects. Radar sensors and systems such as FMCW radars transmit a continuous waveform that is frequency-modulated over time, and the range to the object is determined by measuring the time delay between the transmitted and received signals. The time delay is equal to the round-trip time of the signal, which is the time taken for the signal to travel to the object and back to the radar. The distance R to the reflecting object can be determined as:

$$R = \frac{c|\Delta t|}{2} \tag{1}$$

In Equation (1), c is the speed of light (e.g., in m/s) and $\Delta t$ is the delay time (e.g., in seconds).

Radar angle of arrival (AoA) estimation is the process of determining the direction from which a radio frequency (RF) signal arrives at the radar receiver. This information can be used to locate the position of the target, track the movement of moving objects, and perform other tasks in radar systems. A MIMO radar sensor uses multiple transmit and receive antennas to improve the accuracy of AoA estimation. The signals received at different antennas are used to estimate the AoA using techniques such as maximum likelihood estimation.

Figure 3:
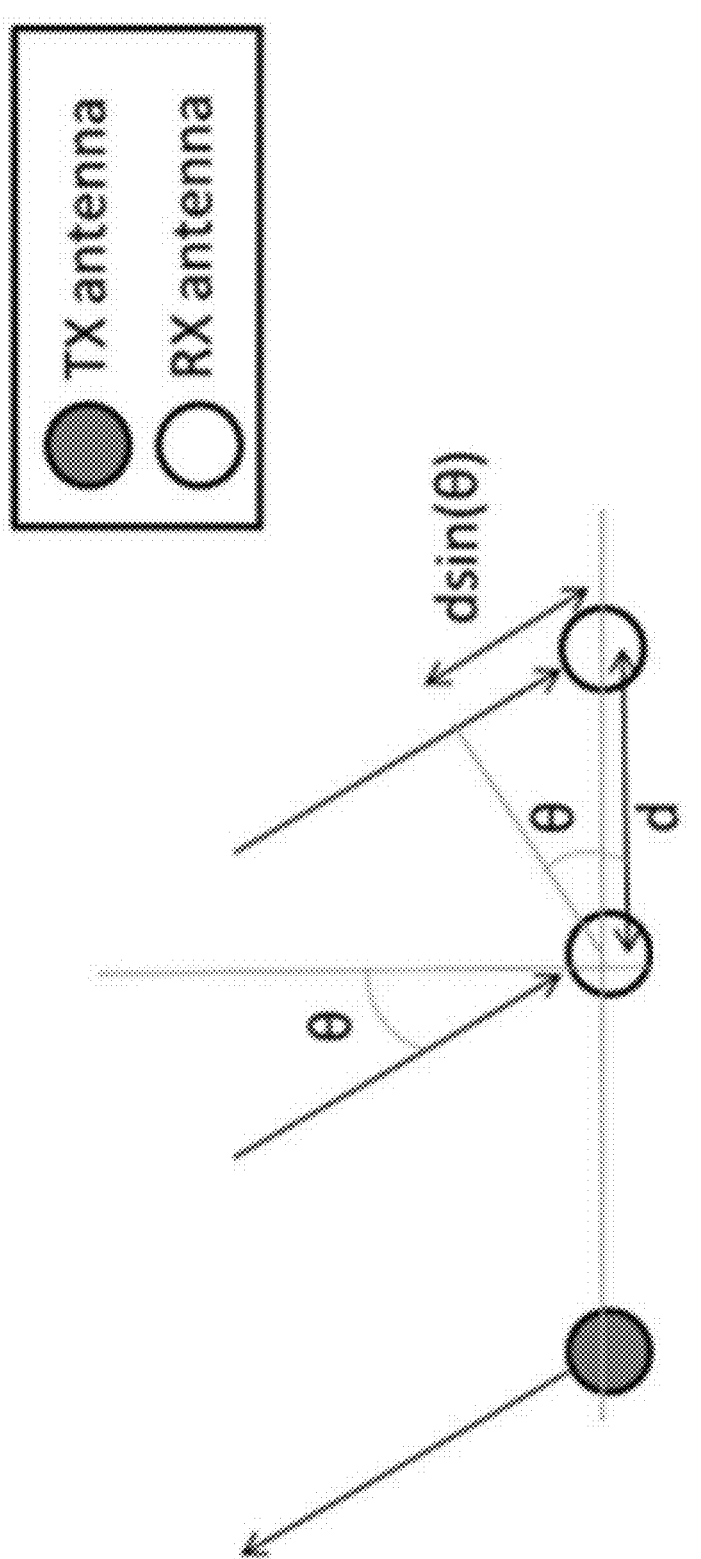
FIG. 3 is a schematic view of angles of transmitted and received signals from a transmitter and multiple receivers of a radar sensor.

FIG. 3 illustrates an AoA estimation using a transmit antenna and two receive antennas. In this example, the transmit antenna transmits a signal that is reflected from an object at an angle $\theta$ relative to the radar sensor. Both receive antennas receive the reflected signal. However, the signal must travel an extra distance of d $\sin(\theta)$ to reach the second receive antenna. This results in a phase difference of $\omega = (2\pi/\lambda)d \sin(\theta)$ between the signals received at the two receive antennas. By estimating this phase difference, the angle of arrival, $\theta$, may be determined via:

$$\theta = \sin^{-1}\left(\frac{\omega\lambda}{2\pi d}\right) \tag{2}$$

Based on the measurements and algorithms of Equation (1) and Equation (2), the angle and range of an object relative to the radar sensor may be estimated. Using this information, a range/angle heat map image may be generated with measurements to convert radar data to images for deep learning framework and train the machine learning model (e.g., the CNN model) for classification. Training samples may be generated to train the model by generating heat map images of seats from a variety of different vehicles that are either (i) empty, (ii) occupied by a child (which may include a car seat or the like), or (iii) occupied by an adult. Each heat map image may be labeled with the ground truth classification (e.g., via a human annotator), and the model may be trained using the generated heat map images to update parameters of the model (e.g., weights and activations).

Figure 4B:
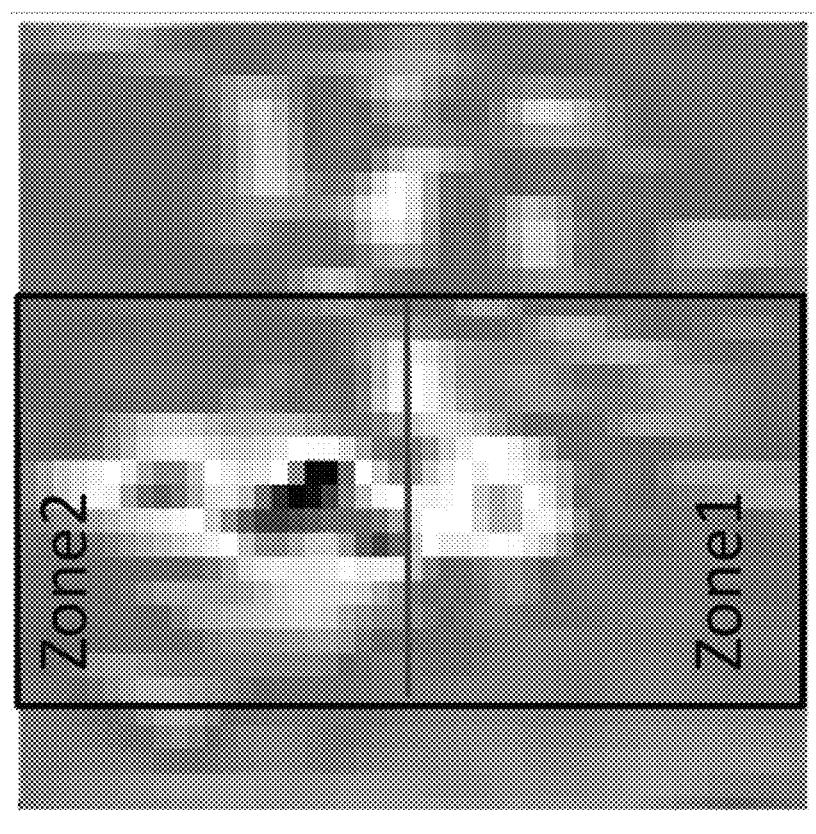
FIG. 4 are exemplary heat map images with multiple zones.
Figure 4A:
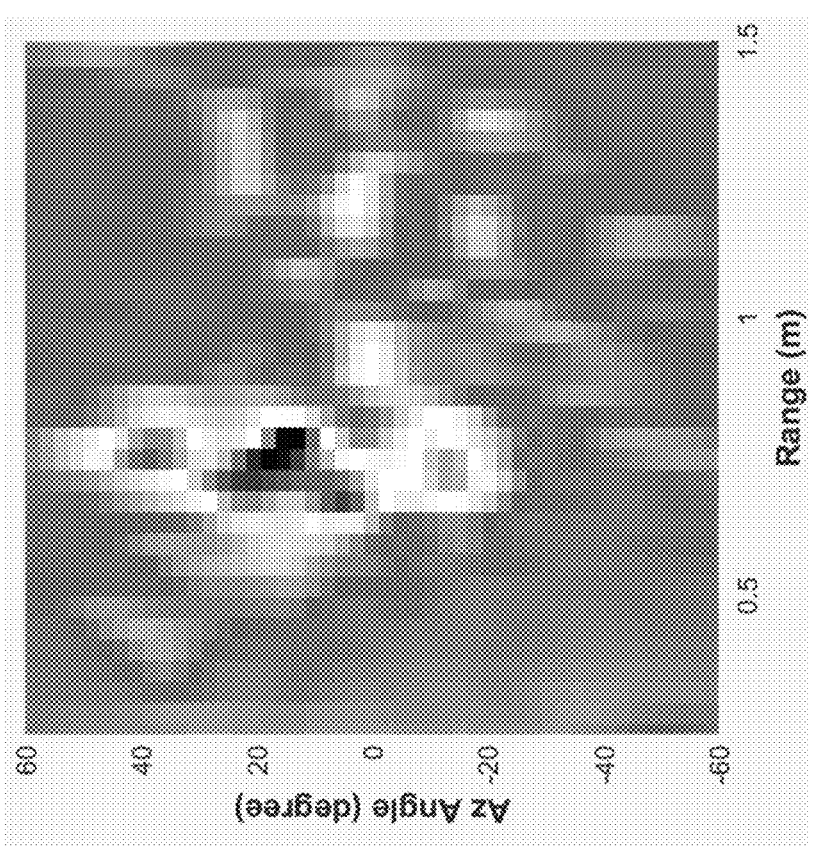
Figure 5B:
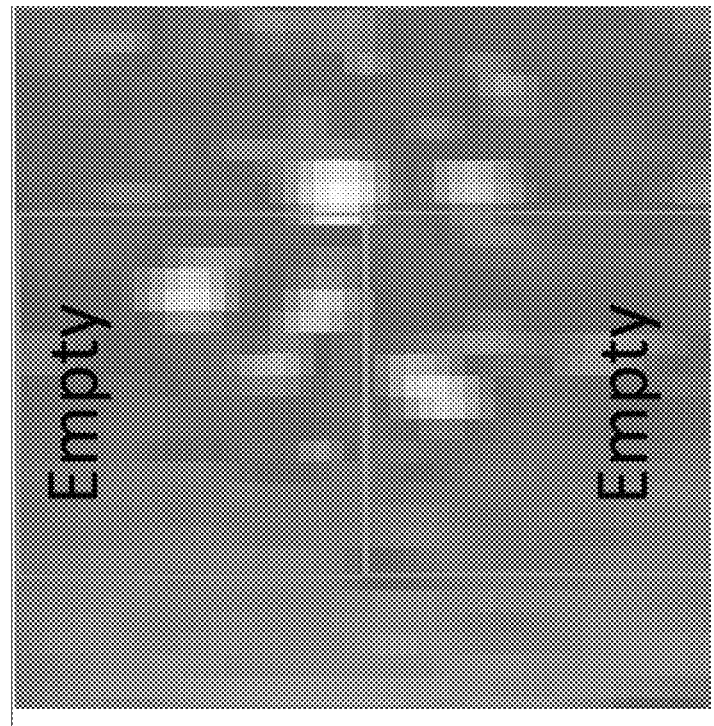
FIGS. 5A-5G are exemplary heat map images where each zone is classified as empty, occupied by an adult, or occupied by a child.
Figure 5A:
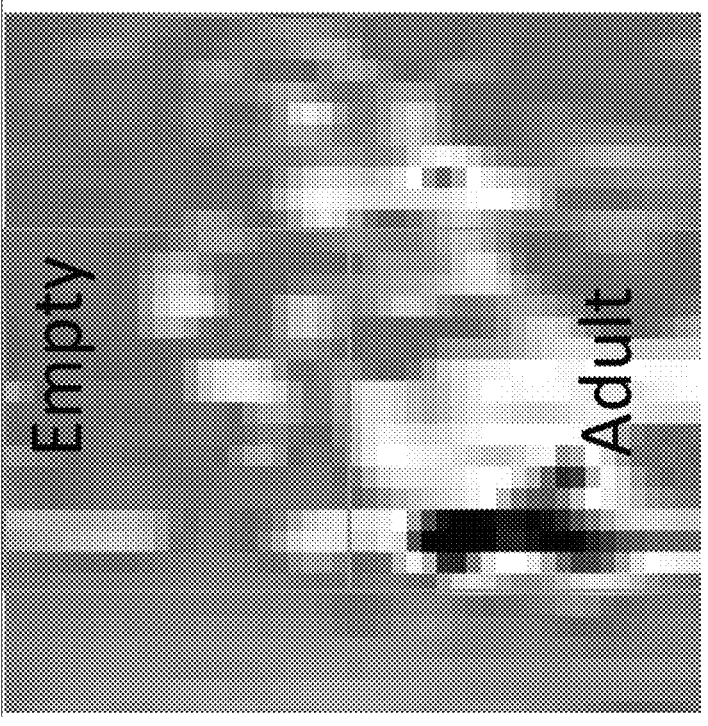
Figure 5D:
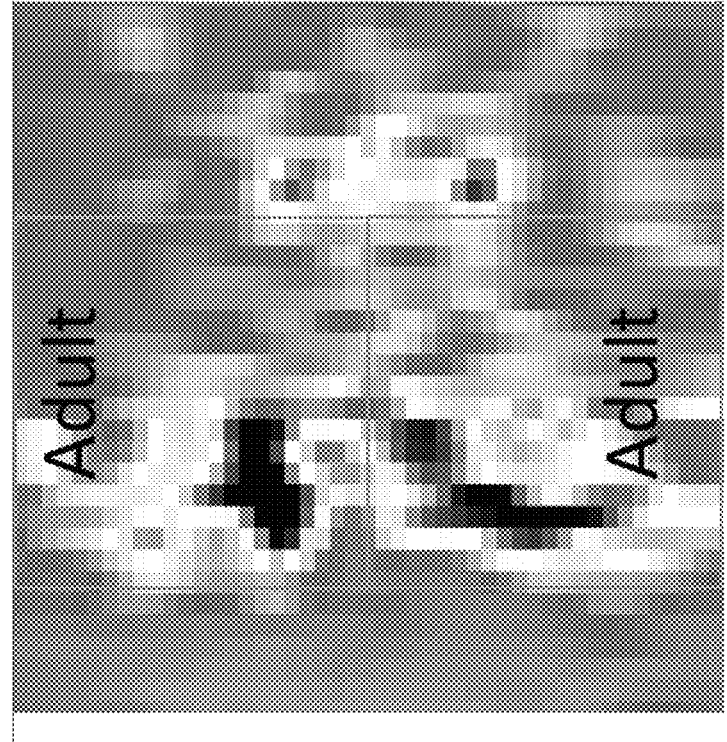
Figure 5C:
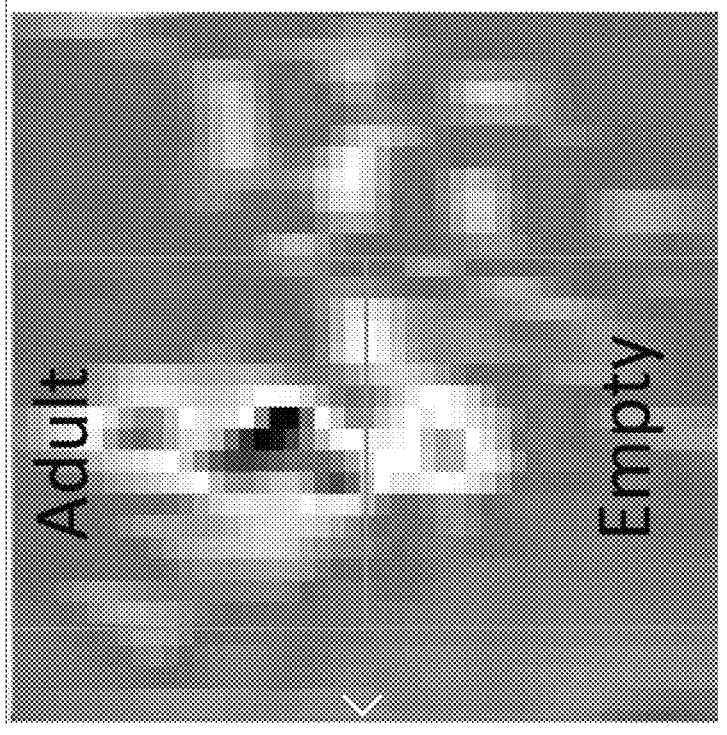
Figure 5F:
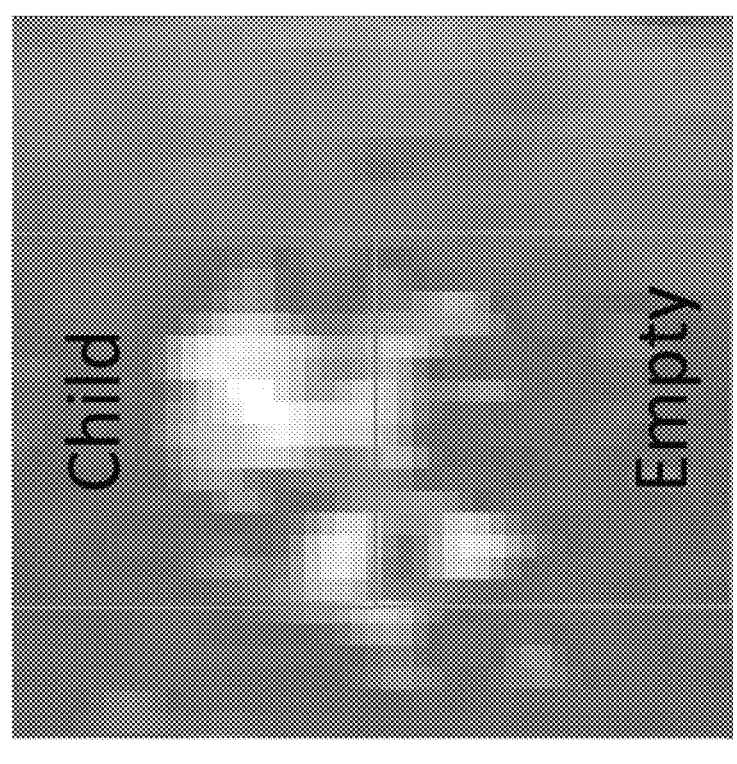
Figure 5E:
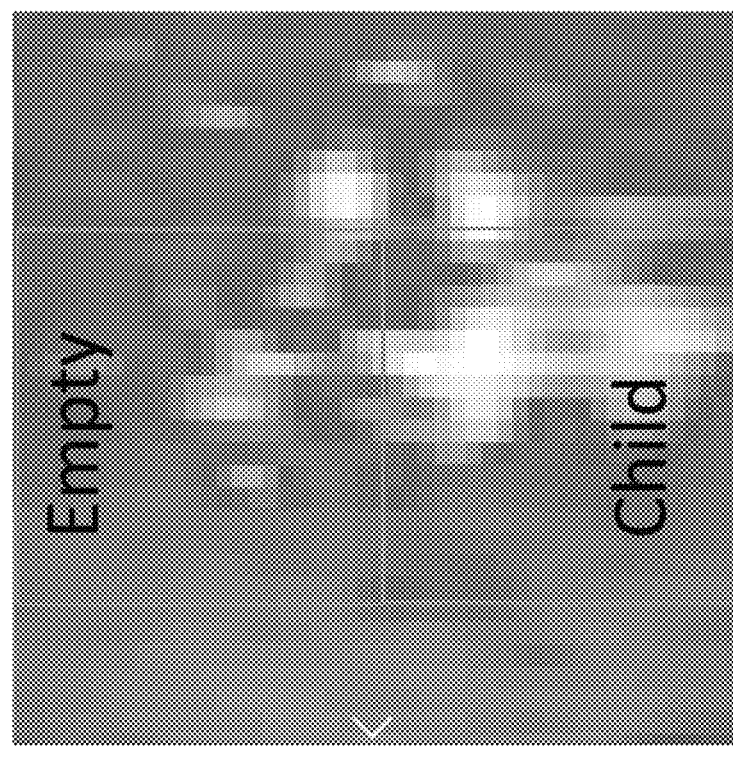
Figure 5G:
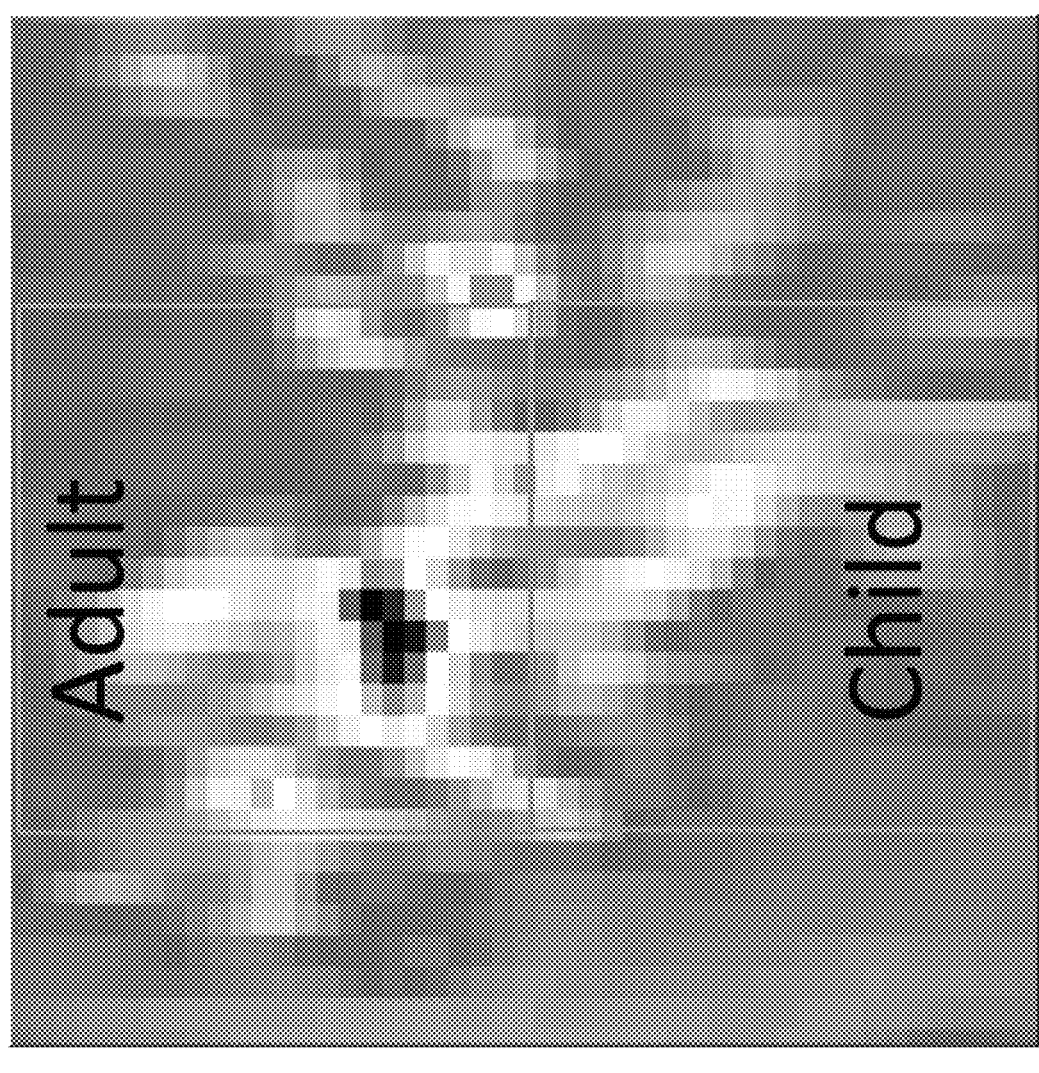

FIG. 4A illustrates an exemplary heat map image derived from sensor data captured by the radar sensor. Optionally, each collected image is split into two or more zones (e.g., by using fixed size cropping or the like). For example, FIG. 4B shows the image of FIG. 4A covering two different zones. Each zone may designate or correspond to a respective seat in the vehicle. The training data captured to train the model should reflect different scenarios of adult/child presence and absence. This is important because the presence of animate or inanimate objects causes reflection and varies the spread of signal, and by including all of the possible scenarios, the model may be trained to be invariant to noise from reflection and spread. FIGS. 5A-5G illustrate different possible combinations of empty seats, seats with children, and seats with adults that may be used to train the model. For example, FIG. 5A includes a zone that is empty (i.e., no human is present in the zone) and a zone with an adult present while FIG. 5B has both zones as empty. FIGS. 5C-5G show other examples of empty zones or a child or adult present at a zone. FIG. 6 includes a table that has zonal information and image count for an example set of images generated to train the model.

Optionally, each image that includes two zones is cropped at the horizontal center to obtain zonal images. These zonal images are used as inputs for the deep learning model training and inference. Each zonal image may be cropped to a specific size dependent upon the specifications of the camera and/or the model. For example, each image is cropped to a size of 267×535 pixels. FIG. 7 includes an exemplary table for class distribution of zonal images for training the model.

By framing the problem as a classification task, the model (e.g., a ResNet-18 model) may be trained on zonal images. The model may output a 3-class probability score on the likelihood of the input belonging to classes (i) empty, (ii) a child, or (iii) an adult. The set of zonal images may be split into a training set and a test set at any ratio (e.g., a 70:30 ratio). Because adjacent frames are very similar in characteristics, the split may be performed similarly to a time-series signal to avoid data leakage. Despite a time-series like split, the data may be treated as independent and identically distributed for model training and testing purposes. An exemplary train/test image count is illustrated in FIG. 7.

The model may include any number of layers and nodes. For example, when the model is a ResNet-18 model, the model is an 18-layer deep learning model which contains close to 11 million parameters. Pretrained weights may be used to initialize the model for training. Due to the complexity of the problem, the model's convolution layer weights may be frozen. In this example, only batch-normalization and fully connected layer weights are trained. The model may be trained for any number (e.g., 5) of epochs using, for example, an Adam optimizer and a learning rate of 1e-2. Exemplary results of test data using a non-quantized model with a 3-class confusion matrix is illustrated in FIG. 8A.

Due to the hardware resource constraints on most embedded devices in automotive applications, it is often important that deployed models are compact in size and do not consume too much power. Optionally, the weights of the model may be quantized to, for example, 8-bit integers (e.g., quantized from 32-bit floats to 8-bit integers). This involves performing post-training quantization (PTQ) on the single precision float32 model using the training dataset for calibration. Exemplary results of test data using a quantized model with a 3-class confusion matrix is illustrated in FIG. 8B. FIG. 8C includes an exemplary table showing quantized and non-quantized model size and runtime comparison.

Figure 9:
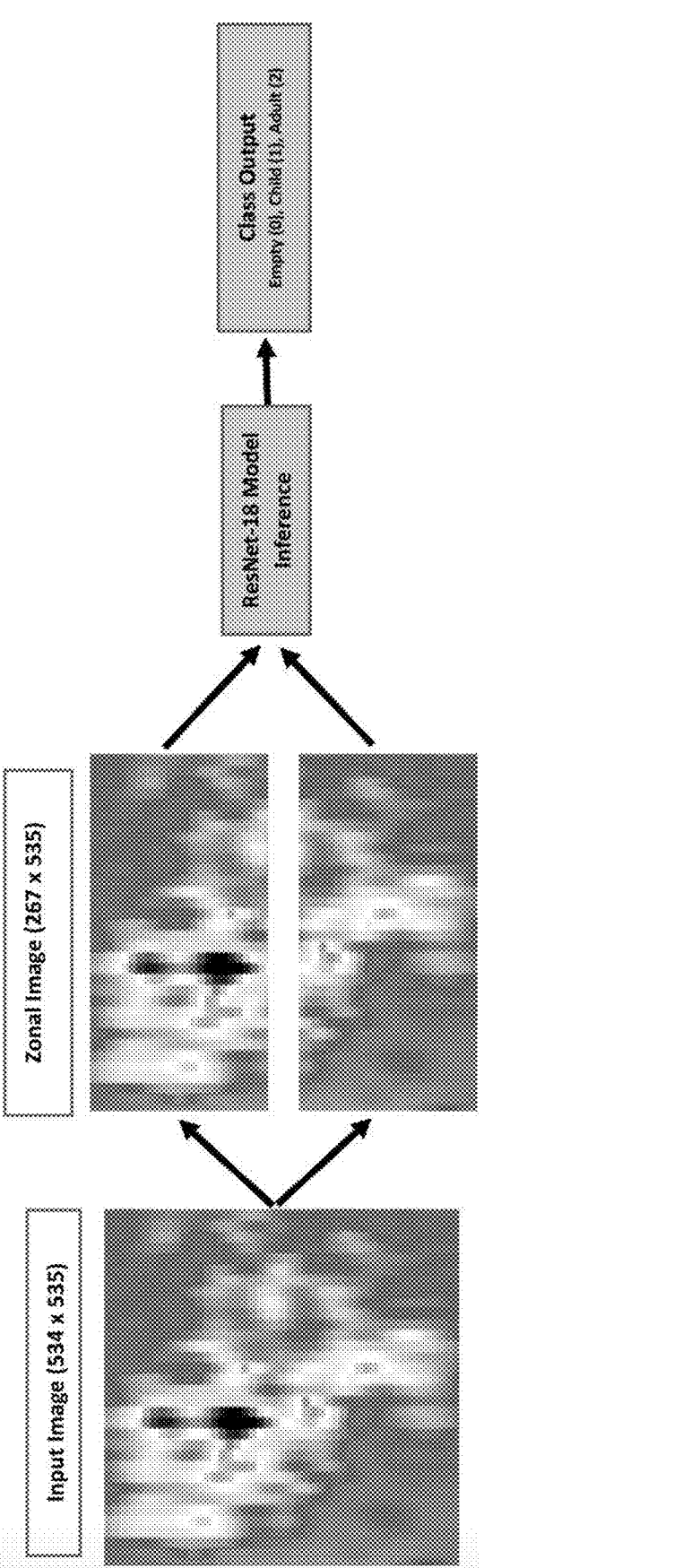
FIG. 9 is a flow diagram of the system of FIG. 1.

Referring now to FIG. 9, during inference, images may be prepared the same or similar to how images are prepared for training. The zonal images are passed through the model, and the outputs are the results. FIG. 9 includes a simple flow diagram detailing the inference process. As shown in FIGS. 8A and 8B, an accuracy of greater than 99 percent is possible for the non-quantized model and an accuracy of greater than 98 percent is possible for the quantized model. The quantized model may realize a 1.8× or greater speed up in runtime at the cost of less than 2 percent drop (or about 1 percent drop) in accuracy. This may be an acceptable tradeoff in many scenarios, such as when deploying deep learning models on resource-constrained embedded devices (e.g., automotive vehicles).

Thus, implementations herein include a deep learning-based classification algorithm (e.g., using a CNN) to classify occupancy of seats or zones in a vehicle as being empty, including an adult, or as including a child using an in-cabin radar sensor of a vehicle. The system makes use of cost-effective and/or non-intrusive sensors. For example, the system includes a low-cost radar sensor, such as an mmWave MIMO FMCW radar sensor with the fusion of a neural network, for highly accurate classification to effectively detect a child left alone in a car (i.e., no adult is present in the vehicle) and alert the owner or the emergency services. The system may only generate the alert when certain conditions are met. For example, the system may only generate the alert when the vehicle is off, when the windows are closed more than a threshold amount, when the system determines that an adult has not been present in the vehicle for at least a threshold period of time, when the external temperature is above an upper temperature threshold or below a lower temperature threshold, etc.

Optionally, the system may generate an alert when the vehicle is turned off, before the driver or adult occupant has exited the vehicle. The alert may include a notification sent to a mobile device of an owner or user or driver of the vehicle, to emergency services, or to any other appropriate entity. In some examples, the system may, in response to detecting a child within the vehicle, activate visual and/or audible alerts (e.g., flash lights, sound the horn, etc.) to attract the attention of those nearby the vehicle (and the system may delay generating this type of alert until determination of the temperature increasing in the cabin of the vehicle or after a period of time has elapsed since the driver or adult occupant has exited the vehicle). In addition to or in alternative to the alert, the system may control a number of functions of the vehicle (e.g., roll down the windows, start a climate control system of the vehicle to regulate the temperature, etc.). The radar sensor provides a less intrusive solution compared to a camera solution. Because collision avoidance radar sensors or advanced driver assistance radars (ADAS) generally operate at 77 GHz, the system may operate at a different frequency (e.g., 60 GHz) so as to not be affected by interference from other radar sensors.

Implementations herein may make use of any machine learning model architecture. For example, the system may implement one or more CNNs, typically used for image-based applications, in a radar application. Optionally, the system uses range-angle heat maps from an mmWave radar as inputs to the models to detect the presence of children in vehicle cabins. This allows the system to formulate the child-detection procedure as a classification task. The system may achieve near-perfect accuracy (FIGS. 8A and 8B) in classifying an occupancy of a seat of a vehicle as empty, occupied by a child, or occupied by an adult. Optionally the model is further quantized to reduce the size of the model, enabling efficient execution on low-power devices such as automotive embedded microcontrollers. FIG. 8C demonstrates that the quantized model exhibits minimal accuracy degradation while significantly reducing runtime by nearly half. Unlike camera-based systems in the market that raise privacy concerns, implementations herein utilize non-intrusive radar technology to address the child-detection problem. The system overcomes the limitations of conventional in-vehicle cameras by strategically placing sensors in carefully selected locations. This allows the system to detect children in areas such as the footwell, which may be obstructed from view of the driver or of a cabin monitoring camera. By utilizing this approach, the system ensures comprehensive coverage and accurate detection of children in the vehicle cabin.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of transmit antennas (e.g., at least two transmit antennas, such as three or more transmit antennas), a plurality of receivers that receive radio signals via the plurality of receive antennas (e.g., at least two receive antennas, such as three or four or more receive antennas), with the received radio signals being transmitted radio signals that are reflected from an object present in the field of sensing of the respective radar sensor. For example, the sensors may use three transmit antennas and four receive antennas. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular cabin monitoring system, the vehicular cabin monitoring system comprising:

a radar sensor disposed at an interior cabin of a vehicle, the radar sensor sensing at least a portion of the interior cabin of the vehicle;

wherein the radar sensor comprises (i) at least one transmitter that transmits radio signals and (ii) a plurality of receivers that receive radio signals;

an electronic control unit (ECU) comprising electronic circuitry and associated software;

wherein the electronic circuitry of the ECU comprises a processor operable to process radar data captured by the radar sensor to generate a heat map image comprising range and angle information;

wherein radar data captured by the radar sensor is transferred to the ECU;

wherein the vehicular cabin monitoring system, via processing by the processor, defines a plurality of zones within the heat map image, wherein each zone of the plurality of zones corresponds to a different seat of the vehicle;

wherein the vehicular cabin monitoring system, via processing by the processor of radar data captured by the radar sensor and using a neural network trained with radar sensor data to process each zone of the plurality of zones, determines occupancy of each seat of the vehicle, and wherein the determined occupancy of each respective seat of the vehicle comprises one selected from the group consisting of (i) the respective seat of the vehicle is not occupied, (ii) the respective seat of the vehicle is occupied by an adult and (iii) the respective seat of the vehicle is occupied by a child;

wherein the vehicular cabin monitoring system generates an alert at least in part responsive to (i) determination that a seat of the vehicle is occupied by a child and (ii) determination that no seat of the vehicle is occupied by an adult; and wherein the vehicular cabin monitoring system generates the alert at least in part responsive to determination that (i) the seat of the vehicle is occupied by the child and (ii) no seat is occupied by an adult for a threshold period of time.

2. The vehicular cabin monitoring system of claim 1, wherein the threshold period of time comprises a threshold period of time after the vehicle is turned off.

3. The vehicular cabin monitoring system of claim 1, wherein the neural network comprises a quantized neural network.

4. The vehicular cabin monitoring system of claim 1, wherein the neural network comprises a convolutional neural network (CNN).

5. The vehicular cabin monitoring system of claim 1, wherein the radar sensor is mounted at a headliner in the cabin of the vehicle.

6. The vehicular cabin monitoring system of claim 5, wherein the radar sensor is disposed between a first row of seats of the vehicle and a second row of seats of the vehicle.

7. The vehicular cabin monitoring system of claim 1, wherein the vehicular cabin monitoring system transmits the alert to at least one from the group consisting of (i) an owner of the vehicle and (ii) emergency services.

8. The vehicular cabin monitoring system of claim 1, wherein the alert comprises at least one selected from the group consisting of (i) flashing a light of the vehicle and (ii) honking a horn of the vehicle.

9. The vehicular cabin monitoring system of claim 1, wherein the vehicular cabin monitoring system, via processing by the processor of radar data captured by the radar sensor, applies a ground clutter filter to the radar data captured by the radar sensor.

10. The vehicular cabin monitoring system of claim 1, wherein the radar sensor operates at a frequency that is different than a frequency at which an advanced driver assist system (ADAS) of the vehicle operates.

11. The vehicular cabin monitoring system of claim 1, wherein the vehicular cabin monitoring system, at least in part responsive to (i) determination that a first seat of the vehicle is occupied by a child, (ii) determination that a second seat of the vehicle is occupied by an adult and (iii) determination that the vehicle is off, generates a second alert indicating the child is present in the vehicle.

12. A vehicular cabin monitoring system, the vehicular cabin monitoring system comprising:

a radar sensor disposed at an interior cabin of a vehicle, the radar sensor sensing at least a portion of the interior cabin of the vehicle;

wherein the radar sensor comprises (i) at least one transmitter that transmits radio signals and (ii) a plurality of receivers that receive radio signals;

an electronic control unit (ECU) comprising electronic circuitry and associated software;

wherein the electronic circuitry of the ECU comprises a processor operable to process radar data captured by the radar sensor to generate a heat map image comprising range and angle information;

wherein radar data captured by the radar sensor is transferred to the ECU;

wherein the vehicular cabin monitoring system, via processing by the processor, defines a plurality of zones within the heat map image, wherein each zone of the plurality of zones corresponds to a different seat of the vehicle;

wherein the radar sensor operates at a frequency that is different than a frequency at which an advanced driver assist system (ADAS) of the vehicle operates;

wherein the vehicular cabin monitoring system, via processing by the processor of radar data captured by the radar sensor, determines occupancy of each respective seat of the vehicle, and wherein the determined occupancy of each seat of the vehicle comprises one selected from the group consisting of (i) the respective seat of the vehicle is not occupied, (ii) the respective seat of the vehicle is occupied by an adult and (iii) the respective seat of the vehicle is occupied by a child;

wherein the vehicular cabin monitoring system generates an alert at least in part responsive to (i) determination that a seat of the vehicle is occupied by a child and (ii) determination that no seat of the vehicle is occupied by an adult; and wherein the vehicular cabin monitoring system generates the alert at least in part responsive to determination that (i) the seat of the vehicle is occupied by the child and (ii) no seat is occupied by an adult for a threshold period of time.

13. The vehicular cabin monitoring system of claim 12, wherein the threshold period of time comprises a threshold period of time after the vehicle is turned off.

14. The vehicular cabin monitoring system of claim 12, wherein the radar sensor is mounted at a headliner in the cabin of the vehicle.

15. The vehicular cabin monitoring system of claim 14, wherein the radar sensor is disposed between a first row of seats of the vehicle and a second row of seats of the vehicle.

16. A vehicular cabin monitoring system, the vehicular cabin monitoring system comprising:

a radar sensor disposed at an interior cabin of a vehicle, the radar sensor sensing at least a portion of the interior cabin of the vehicle;

wherein the radar sensor comprises (i) at least one transmitter that transmits radio signals and (ii) a plurality of receivers that receive radio signals;

an electronic control unit (ECU) comprising electronic circuitry and associated software;

wherein the electronic circuitry of the ECU comprises a processor operable to process radar data captured by the radar sensor to generate a heat map image comprising range and angle information;

wherein radar data captured by the radar sensor is transferred to the ECU;

wherein the vehicular cabin monitoring system, via processing by the processor, defines a plurality of zones within the heat map image, wherein each zone of the plurality of zones corresponds to a different seat of the vehicle, and wherein the plurality of zones comprises a first row of seats and a second row of seats;

wherein the vehicular cabin monitoring system, via processing by the processor of radar data captured by the radar sensor to process each zone of the plurality of zones, determines occupancy of each seat of the vehicle, and wherein the determined occupancy of each respective seat of the vehicle comprises one selected from the group consisting of (i) the respective seat of the vehicle is not occupied, (ii) the respective seat of the vehicle is occupied by an adult and (iii) the respective seat of the vehicle is occupied by a child;

wherein the vehicular cabin monitoring system generates an alert at least in part responsive to (i) determination that a seat of the vehicle is occupied by a child and (ii) determination that no zone of the vehicle is occupied by an adult; and wherein the vehicular cabin monitoring system generates the alert at least in part responsive to determination that (i) the seat of the vehicle is occupied by the child and (ii) no seat is occupied by an adult for a threshold period of time, and wherein the threshold period of time comprises a threshold period of time after the vehicle is turned off.

17. The vehicular cabin monitoring system of claim 16, wherein the vehicular cabin monitoring system transmits the alert to at least one from the group consisting of (i) an owner of the vehicle and (ii) emergency services.

18. The vehicular cabin monitoring system of claim 17, wherein the alert comprises at least one selected from the group consisting of (i) flashing a light of the vehicle and (ii) honking a horn of the vehicle.

19. The vehicular cabin monitoring system of claim 18, wherein the vehicular cabin monitoring system, via processing by the processor of radar data captured by the radar sensor, applies a ground clutter filter to the radar data captured by the radar sensor.

\* \* \* \* \*